United States Patent

Dvorak

[11] Patent Number: 5,884,266
[45] Date of Patent: Mar. 16, 1999

[54] AUDIO INTERFACE FOR DOCUMENT BASED INFORMATION RESOURCE NAVIGATION AND METHOD THEREFOR

[75] Inventor: Joseph L. Dvorak, Boca Raton, Fla.

[73] Assignee: Motorola, Inc., Schaumburg, Ill.

[21] Appl. No.: 832,009

[22] Filed: Apr. 2, 1997

[51] Int. Cl.$^6$ .................................................. G10L 5/02
[52] U.S. Cl. ..................... 704/275; 704/270; 704/260; 395/604; 395/605; 364/140
[58] Field of Search .................. 704/260, 270, 704/275; 395/604, 605, 12, 793; 364/140; 345/326

[56] References Cited

U.S. PATENT DOCUMENTS

| | | | |
|---|---|---|---|
| 5,231,670 | 7/1993 | Goldhor et al. | 704/275 |
| 5,297,027 | 3/1994 | Morimoto et al. | 707/501 |
| 5,333,237 | 7/1994 | Stefanopoulos et al. | 395/12 |
| 5,572,643 | 11/1996 | Judson | 395/793 |
| 5,615,300 | 3/1997 | Hara et al. | 704/260 |
| 5,659,665 | 8/1997 | Whelpley, Jr. | 704/275 |
| 5,659,742 | 8/1997 | Beattie et al. | 395/615 |
| 5,677,993 | 10/1997 | Ohga et al. | 704/275 |
| 5,696,879 | 12/1997 | Cline et al. | 704/260 |
| 5,699,486 | 12/1997 | Tullis et al. | 704/270 |
| 5,717,914 | 2/1998 | Husick et al. | 395/605 |
| 5,721,902 | 2/1998 | Schultz | 395/604 |
| 5,732,219 | 3/1998 | Blumer et al. | 395/200.57 |
| 5,737,619 | 4/1998 | Judson | 395/761 |
| 5,745,360 | 4/1998 | Leone et al. | 364/140 |
| 5,748,188 | 5/1998 | Hu et al. | 345/326 |
| 5,752,022 | 5/1998 | Chiu et al. | 395/610 |

OTHER PUBLICATIONS

WebSpeak 1.2 Documentation Chapter 1, The Productivity Works, Inc., 1996.

*Primary Examiner*—David R. Hudspeth
*Assistant Examiner*—Vijay B. Chawan
*Attorney, Agent, or Firm*—Andrew S. Fuller

[57] ABSTRACT

An audio interface (110) provides access to a hypertext document and enables link navigation (310). The hypertext document has textual information, including one or more text-based link identifiers that represent links to information sources. The audio interface outputs the textual information of the document as speech, while distinguishing the text-based link identifiers using distinct sound characteristics (320, 330, 340, 350). Preferably, the audio interface operates to receive voice commands that specify one or more of the test-based link identifies (410). Upon receipt of such a voice command, the audio interface performs a particular action using the associated link address (420, 430).

6 Claims, 4 Drawing Sheets

5,884,266

AUDIO INTERFACE FOR DOCUMENT BASED INFORMATION RESOURCE NAVIGATION AND METHOD THEREFOR

TECHNICAL FIELD

This invention relates in general to voice based systems and hypertext browsers.

BACKGROUND

The Hypertext Markup Language (HTML) has gained wide acceptance as a standard for providing document based navigation to a variety of information sources. HTML is currently used with the Hypertext Transfer Protocol (HTTP) to access text, graphics, image, audio, and video based information. HTML uses a hypertext reference tag, commonly known as a link, to provide a means for accessing a particular information source. A link usually has an identifier, sometimes referred as anchor text, and an associated address to an information source, which may be a local file or remote networked server. Browsers are generally available that interpret HTML formatted documents for presentation to a user. These browsers typically represent a hypertext reference tag as highlighted text or graphics that a user can easily visualize as representing a selectable link.

Voice based interface systems are known. These systems may involve speech recognition or speech synthesis. A speech synthesizer often converts a text source to audible information. A speech recognition system converts audible information into digital information that can be interpreted as distinct words or concepts. Interactive voice based systems that incorporate both speech recognition and speech synthesis would be desirable for a variety of applications. Such systems would be beneficial for the visually impaired user, or for situations where a display interface is inadequate or must be supplemented.

Prior art information browsers do not adequately address cases in which an audio interface may be appropriate. Therefore, a new audio interface for document based information resource navigation is needed.

DETAILED DESCRIPTION OF THE PREFERRED EMBODIMENT

Generally, the present invention provides for an audio interface for a hypertext document. In operation, the audio interfaces accesses a document that has textual information, including one or more text-based link identifiers that represent links to information sources. The audio interface outputs the textual information of the document as speech, while distinguishing the text-based link identifier using distinct sound characteristics. Preferably, the audio interface operates to receive voice commands that specify one or more of the test-based link identifies. Upon receipt of such a voice command, the audio interface performs a particular action using the associated link address. In the preferred embodiment, the audio interface processes Hypertext Markup Language (HTML) documents to generate a textual output for conversion by a speech synthesizer. The HTML documents are filtered to remove non-text information. For input purposes, the audio interface uses a speech recognition system to process a voice command that includes at least a portion of a text-based link identifier. The audio interface is responsive to voice commands to initiate access to a corresponding information source.

Figure 1:
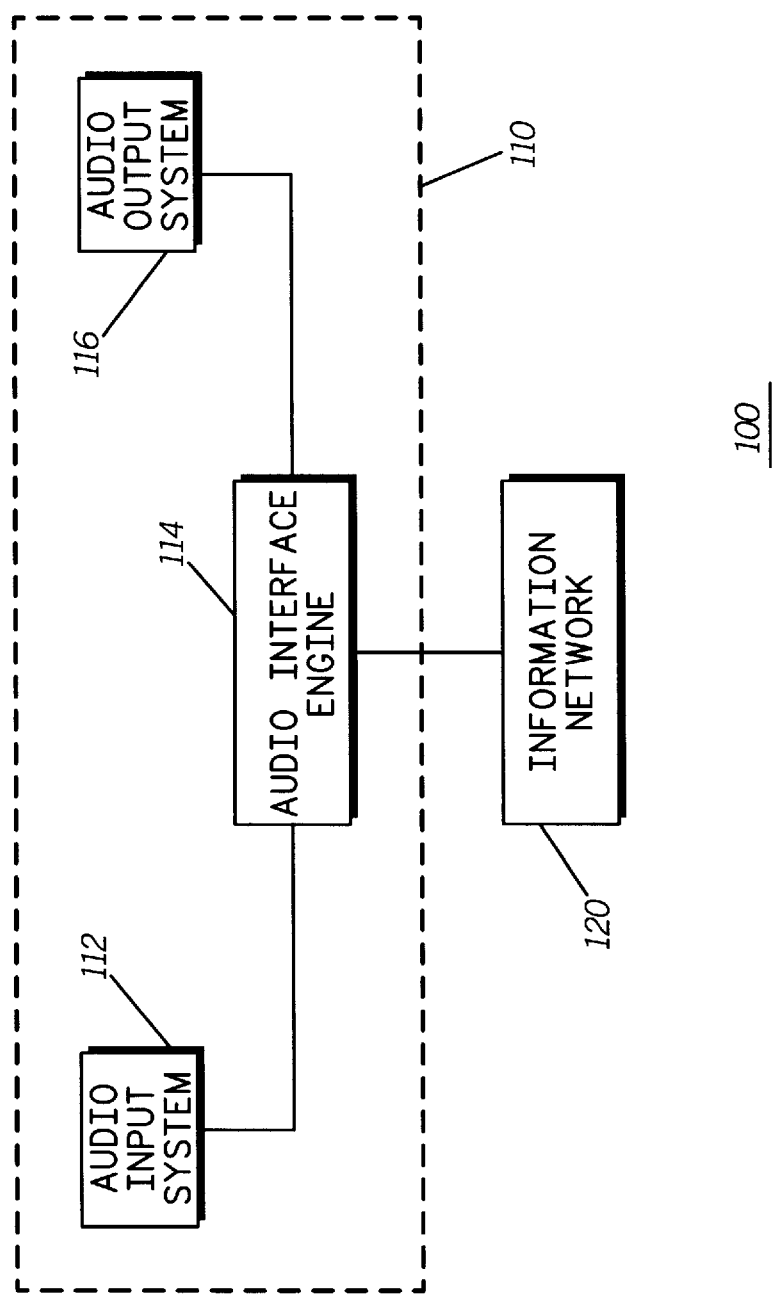
FIG. 1 is a block diagram of an audio interface environment, in accordance with the present invention.

FIG. 1 is a block diagram of an audio interface environment 100, in accordance with the present invention. The audio interface environment 100 includes an audio interface system 110 that interfaces with an information network 120. The information network may be a private network, such as an intranet, or may be a public network, such as the worldwide network of computers commonly known as the internet. The interface may be implemented using a local network, modem, or other network link well known in the art. The audio interface system 110 includes an audio input system 112, an audio input interface engine 114, and an audio output system 116. The audio input system 112 is coupled to the audio input interface engine 114 and ordinarily includes a microphone and other audio processing hardware (not shown) that provide clean audio signals suitable for translation by a speech recognition system. The audio output system 116 is coupled to the audio input interface engine 114 and ordinarily includes a speaker and audio processing hardware (not shown) to render high fidelity audio information.

Figure 2:
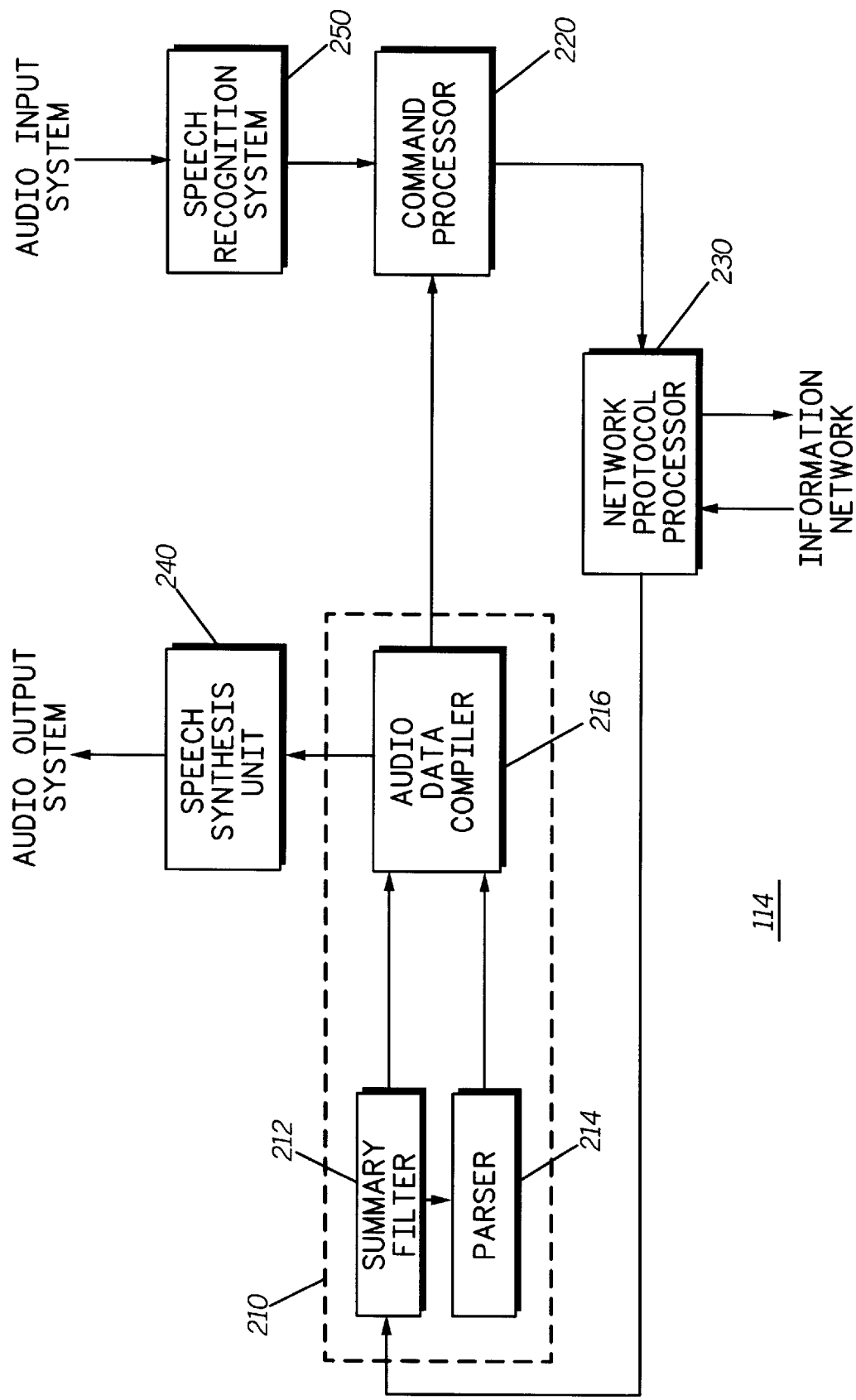
FIG. 2 is a block diagram of a major component of an audio interface for a hypertext document, in accordance with the present invention.

FIG. 2 shows a block diagram of the audio interface engine 114, in accordance with the present invention. The audio interface engine 114 includes a document processor 210, a command processor 220, a network protocol processor 230, a speech synthesis unit or synthesizer 240, and a speech recognition system 250. According to the present invention, the audio interface engine 114 operates on a hypertext document, i.e., a document having textual information and contextually embedded resource links that are used for navigation to remote or local information sources. A resource link generally includes an identifier or descriptor which may be graphical or textual in nature, and an associated address that locates an information source. The address is specified according to a particular protocol, and may identify an information source as local as within the hypertext document itself, and or as remote as a document on a distant computer accessible over an information network. The network protocol processor 230 provides a mean of retrieving hypertext documents from the information network. Document retrieval typically involves a formulation of a query that is formatted to include the address of the targeted document. In the preferred embodiment, the network protocol processor interfaces with the internet using a high level protocol such as the Hypertext Transport Protocol (HTTP), the File Transfer Protocol (FTP), electronic mail protocols, among other existing protocols. Procedures for interfacing with the internet are well known in the art.

The document processor 210 processes a hypertext document to enable audio presentation of suitable contents of the document. Generally, the processor 210 separates the portion of the document intended to be presented as text from other portions intended to represent directives for document presentation and user interface manipulation, or intended for other purposes. The hypertext links are identified and processed such that when aurally rendered, these hypertext links have distinct sound characteristics that are readily recognizable by a listener as representing hypertext links.

In the preferred embodiment, the document processor 210 includes a summary filter 212, a parser 214, and an audio data compiler 216. The summary filter 212 has as its input a hypertext document 205, such as received from the information network 120 via the network protocol processor 230. Note that the hypertext document 205 may be also obtained from a local source via the network protocol processor 230 or otherwise. The filter 212 process the hypertext document outputting a filtered document that represents the hypertext document with information not useful to facilitate audio output removed. The information removed includes document content not translatable to speech, such as non-text information and browser directives for presentation management and for housekeeping. The information remaining ordinarily includes text for output to a user and resource links for information source navigation. The parser 214 operates on the filtered hypertext document to extract contextually embedded resource links, and to generate an associative list of text-based link identifiers and corresponding addresses for the embedded links.

The outputs of the summary filter 212 and the parser 214 are fed into an audio data compiler 216 that adds speech synthesis commands to the text-based link identifier to aurally distinguish these identifiers from the surrounding textual data. Preferably, the audio data compiler 216 surrounds the link identifiers with directives that are recognized by the speech synthesizer. These directives may indicate that the identified text is to be aurally rendered with a particular voice pitch, volume, or other sound or audio characteristics which are readily recognizable by a user as distinct from the surrounding text. The document processor 210 is coupled to the speech synthesis unit 240. The document processor provides an output of textual information and speech synthesis directives. The textual information includes text-based link identifiers that are contextually embedded and which represent links to information sources. The document processor 210 cooperates with the speech synthesis 240 to output the textual information as speech, while distinguishing the text-based link identifiers from other textual information using sound characteristics. The speech synthesis unit 240 is coupled to the audio output system 116 for the presentation of speech information.

Preferably, the audio interface system 110 also operates to receive a voice command that specifies an action with respect to a resource link within a hypertext document. The voice command is inputted via the audio input system and ordinarily includes at least a portion of a particular text-based resource link identifier, selected in response to one or more previously outputted link identifiers within an audio output stream representing the hypertext document. The speech recognition system 250, which is coupled to the audio input system 112, generates a digital representation of the voice command. The command processor 220, which is coupled to the speech recognition system 250, processes the voice command and takes appropriate action. Voice commands may be received and processed while the audio interface system 110 is outputting textual information. The command processor 220 is responsive to the voice command to initiate access to the information source corresponding to the text-based link identifier. The command processor 220 associates the referenced resource identifier with a corresponding address and interfaces with the network protocol processor 230 to initiate access to a particular information source on the information network. The audio interface system 110 may be implemented using software and hardware components that are resident on a single computer or that are distributed over a computer network.

Figure 3:
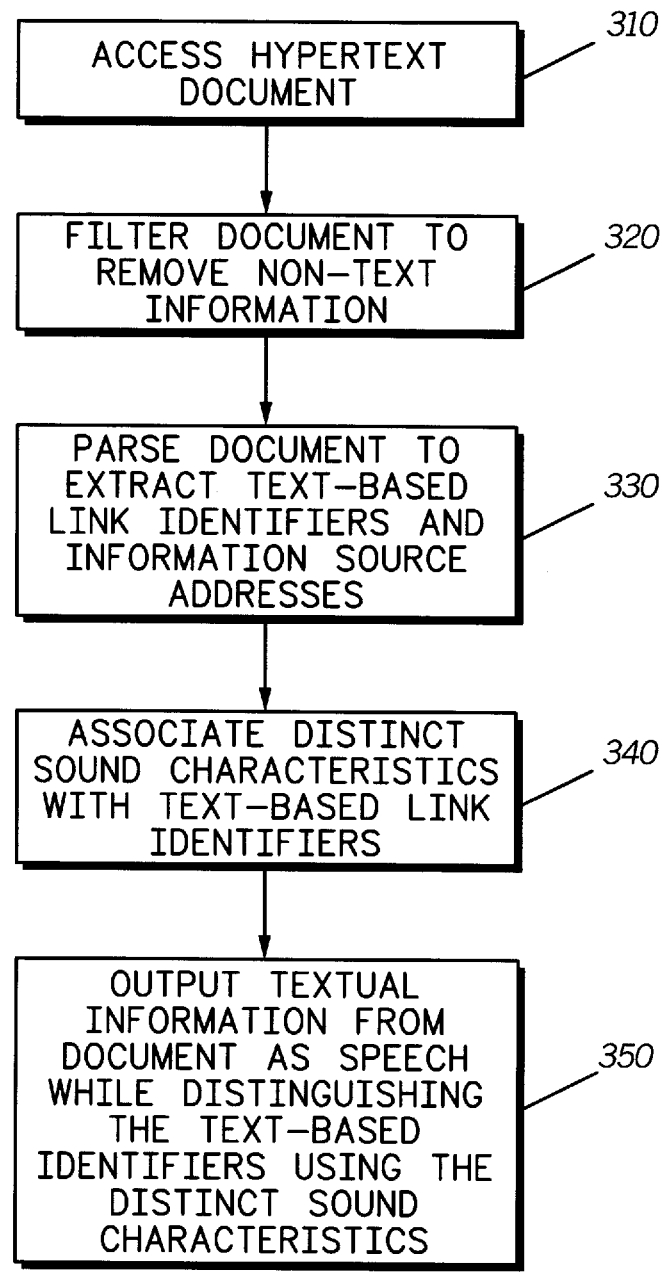
FIG. 3 is a flowchart of procedures for aurally rendering hypertext documents, in accordance with the present invention.

FIG. 3 is a flowchart of procedures 300 for outputting information from a hypertext document, in accordance with the present invention. The hypertext document is accessed or retrieved from an information source, step 310. The information source may represent a remotely situated computer, a local file system, or a particular document. The hypertext document is filtered to remove non-text information, i.e., information not suitable to facilitate speech presentation of the document, step 320. The document is then parsed to extract text-based link identifiers and corresponding information source addresses, step 330. The filtered and parsed information are stored and used to compile data to be aurally rendered. The textual information from the document is compiled such that distinct sound characteristics are associated with the text-based link identifiers, to aurally distinguish these identifiers from other surrounding text information, step 340. The textual information from the document is then outputted as speech, while distinguishing the text-based identifiers using the distinct sound characteristics, step 350. Preferably, the text-based identifier are aurally distinguished by varying voice pitch, volume, or tone.

Figure 4:
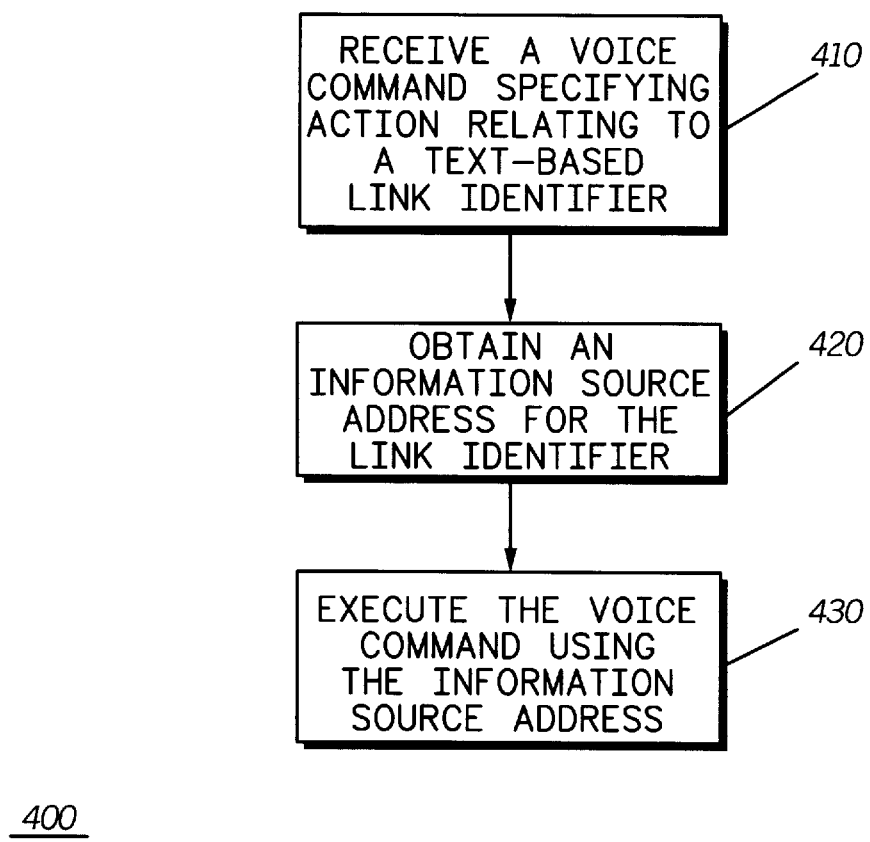
FIG. 4 is a flowchart of procedures for processing voice commands related to a hypertext document, in accordance with the present invention.

FIG. 4 is a flowchart of procedures 400 for hypertext resource navigation, in accordance with the present invention. The audio interface receives a voice command specifying action relating to a particular text-based link identifier, step 410. Generally, the voice command is specifically linked to a particular resource identifier selected from one or more resource identifiers outputted by the audio interface. The audio interface obtains an information source address for the link identifier, step 420, and executes the voice command using the information source address, step 430. In the preferred embodiment, a HTTP or other suitable protocol message is formatted that executes the voice command when appropriate.

The present invention provides significant advantages over the prior art. By aurally rendering a hypertext link identifier in a manner readily distinguishable by a listener, and by combining a speech recognition system that responds to voice commands that incorporate at least a portion of the link identifier, an audio interface is provided that facilitates document based information resource navigation.

What is claimed is:

1. An audio interface for accessing a hypertext document and for providing corresponding information resource navigation, the audio interface comprising:

an audio output system;

an interface engine coupled to the audio output system to provide speech output, the interface engine comprising:

a speech synthesis unit coupled to the audio output system; and a document processor coupled to the speech synthesis unit, and having as input the hypertext document, and having as output textual information, including a text-based link identifier for a contextually embedded link to an information source, wherein the document processor interfaces with the speech synthesis unit to output the textual information as speech, such that the text-based link identifier is outputted using sound characteristics that distinguish text-based link dentifiers from speech representing other portions of the textual information.

2. The audio interface of claim 1, further comprising:

an audio input system coupled to the interface engine, and having an input of a voice command that includes at least a portion of the text-based link identifier; and wherein the interface engine further comprises a command processor that is responsive to the voice command to initiate access to the information source corresponding to the text-based link identifier.

3. The audio interface of claim 2, further comprising a speech recognition system having an input coupled to the audio input system and an output coupled to the command processor, and operable to process the voice command.

4. The audio interface of claim 1, wherein the document processor further comprises a filter having an input of the hypertext document and an output of a filtered document that represents the hypertext document with information that is not translatable to speech removed.

5. The audio interface of claim 1, wherein the document processor further comprises a parser that generates an associative list of text-based link identifiers and contextually embedded links.

6. An audio interface for accessing a hypertext document and for providing corresponding information resource navigation through a voice command, the audio interface having access to an information network, the audio interface comprising:

an audio input system;

and audio output system;

an interface engine coupled to the audio input system to receive voice commands, and to the audio output system to provide speech output, the interface engine comprising:

a speech synthesis unit coupled to the audio output system;

a document processor coupled to the speech synthesis unit, and having as input the hypertext document, and having as output textual information, including a text-based link identifier for a contextually embedded link to an information source on the information network, wherein the document processor interfaces with the speech synthesis unit to output the textual information as speech, such that the text-based link identifier is outputted using sound characteristics that distinguish text-based link identifiers from speech representing other portions of the textual information;

a speech recognition system coupled to the audio input system to receive and process the voice command; and a command processor that interfaces with the speech recognition system, to initiate access to the information source on the information network corresponding to the voice command, when the voice command includes at least a portion of the text-based link identifier.

* * * * *